US012784944B2

(12) United States Patent
Song et al.

(10) Patent No.: US 12,784,944 B2
(45) Date of Patent: Nov. 3, 2026

(54) ISOLATION ENHANCED THERMALLY PROTECTED METAL OXIDE VARISTOR

(71) Applicant: Dongguan Littelfuse Electronics Company Limited, Dongguan (CN)

(72) Inventors: Dongjian Song, Dongguan (CN); Charles Hu, Dongguan (CN)

(73) Assignee: Dongguan Littelfuse Electronics, Co., Ltd., Dongguan (CN)

( * ) Notice: Subject to any disclaimer, the term of this patent is extended or adjusted under 35 U.S.C. 154(b) by 494 days.

(21) Appl. No.: 18/375,324

(22) Filed: Sep. 29, 2023

(65) Prior Publication Data

US 2024/0112836 A1 Apr. 4, 2024

(30) Foreign Application Priority Data

Sep. 29, 2022 (CN) ......................... 202211202021.2

(51) Int. Cl.
*H01C 7/12* (2006.01)
*H01C 1/14* (2006.01)

(52) U.S. Cl.
CPC ................. *H01C 7/12* (2013.01); *H01C 1/14* (2013.01)

(58) Field of Classification Search
CPC ............ H01C 1/14; H01C 7/12; H01C 1/024; H01C 1/144; H01C 1/16; H01C 7/102; H01C 7/126; H01C 13/02
See application file for complete search history.

(56) References Cited

U.S. PATENT DOCUMENTS 7,741,946 B2 6/2010 Ho
8,780,521 B2 * 7/2014 Xu .......................... H01C 7/12 361/126
8,870,521 B2 10/2014 Brecht
2007/0200657 A1 * 8/2007 Tsai ....................... H01C 7/102 338/21
2010/0140563 A1 6/2010 Kasuga
2016/0125983 A1 * 5/2016 Hsu ........................ H01C 1/144 338/21
2018/0102640 A1 * 4/2018 Crevenat ................ H02H 9/042

FOREIGN PATENT DOCUMENTS

| | | | | |
|---|---|---|---|---|
| CN | 101641757 A | * | 2/2010 | ............. H01H 69/02 |
| CN | 101752046 A | | 6/2010 | |
| CN | 102982931 A | | 3/2013 | |
| CN | 103140721 A | | 6/2013 | |
| CN | 104409616 A | * | 3/2015 | ......... H10H 20/8582 |
| CN | 216749497 U | | 6/2022 | |
| EP | 2194541 B1 | * | 7/2017 | ......... C04B 35/6261 |

OTHER PUBLICATIONS

CN-101641757 machine translation (Year: 2010).*
CN-104409616 machine translation (Year: 2015).*

* cited by examiner

*Primary Examiner* — Kyung S Lee
(74) *Attorney, Agent, or Firm* — KDW Firm, PLLC

(57) ABSTRACT

A metal oxide varistor (MOV) includes an MOV body, a first electrode, a second electrode, and a thermal cut-off (TCO). The MOV body is a crystalline microstructure with zinc oxide mixed with one or more metal oxides. The first electrode is adjacent a first side of the MOV body and is connected to a first radial lead. The second electrode is adjacent a second side of the MOV body and is connected to a second radial lead. The TCO is adjacent the second electrode and consists of solder paste with at least one core. The at least one core is a solid at a first temperature and a liquid at a second temperature.

17 Claims, 9 Drawing Sheets

ISOLATION ENHANCED THERMALLY PROTECTED METAL OXIDE VARISTOR

CROSS-REFERENCE TO RELATED APPLICATIONS

This application claims the benefit of priority to, Chinese Patent Application No. 202211202021.2, filed Sep. 29, 2022, entitled “Isolation Enhanced Thermally Protected Metal Oxide Varistor”, which application is incorporated herein by reference it its entirety.

FIELD OF THE DISCLOSURE

Embodiments of the present disclosure relate to metal oxide varistors (MOVs) and, more particularly, to radial lead MOVs.

BACKGROUND

Overvoltage protection devices are used to protect electronic circuits and components from damage due to overvoltage fault conditions. The overvoltage protection devices may include metal oxide varistors (MOVs), connected between the circuits to be protected and a ground line. The MOV includes a crystalline microstructure that allows the MOV to dissipate very high levels of transient energy across the entire bulk of the device.

MOVs are typically used for the suppression of lightning and other high energy transients found in industrial or AC line applications. Additionally, MOVs are used in DC circuits such as low voltage power supplies and automobile applications. Their manufacturing process permits many different form factors with radial leaded discs being the most common. Under an abnormal overvoltage condition, the MOV may catch fire. Or the epoxy coating of the MOV may burn due to overheating of the MOV.

A thermally protected MOV (TMOV) additionally includes an integrated thermally activated element, such as a thermal cut-off (TCO) wire, that is designed to break in the event of overheating due to the abnormal overvoltage event. The TCO wire will melt and flow onto the MOV electrode to form an open circuit. Occasionally, the random flow of the TCO wire will cause the separated molten wires to reconnect, which also may cause a fire.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a metal oxide varistor (MOV) in accordance with the present disclosure may include an MOV body, a first electrode, a second electrode, and a thermal cut-off (TCO). The MOV body is a crystalline microstructure with zinc oxide mixed with one or more metal oxides. The first electrode is located adjacent a first side of the MOV body and is connected to a first radial lead. The second electrode is adjacent a second side of the MOV body and is connected to a second radial lead. The TCO is adjacent the second electrode and consists of solder paste with at least one core. The at least one core is a solid at a first temperature and a liquid at a second temperature.

Another exemplary embodiment of an MOV in accordance with the present disclosure may include an MOV body, a first ceramic resistor, a second ceramic resistor, a first electrode, and a barrier layer. The MOV body is a crystalline microstructure that blocks conduction at low voltages and is the source of nonlinear electrical conduction at higher voltages. The first and second ceramic resistors are coated with an encapsulant. The MOV body is located between the first ceramic resistor and the second ceramic resistor. The first electrode, which is connected to a first radial lead, is located between the MOV body and the first ceramic resistor. The barrier layer is located between the first electrode and the first ceramic resistor and keeps the encapsulant from catching fire in response to overheating of the MOV body.

DETAILED DESCRIPTION

A thermally protected metal oxide varistor (TMOV) for providing overvoltage protection is disclosed. The TMOV includes a thermal cut-off (TCO) that is made from a solder paste having one or more cores. The cores are solid at one temperature but become liquid once the temperature exceeds 120° C. The TMOV also includes a barrier layer disposed adjacent one of the electrodes. The barrier layer is made of a metal foil that protects the encapsulant-coated ceramic resistor from catching fire due to the MOV body getting excessively hot. The TCO and barrier layers thus ensure that the TMOV works as designed.

For the sake of convenience and clarity, terms such as “top”, “bottom”, “upper”, “lower”, “vertical”, “horizontal”, “lateral”, “transverse”, “radial”, “inner”, “outer”, “left”, and “right” may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
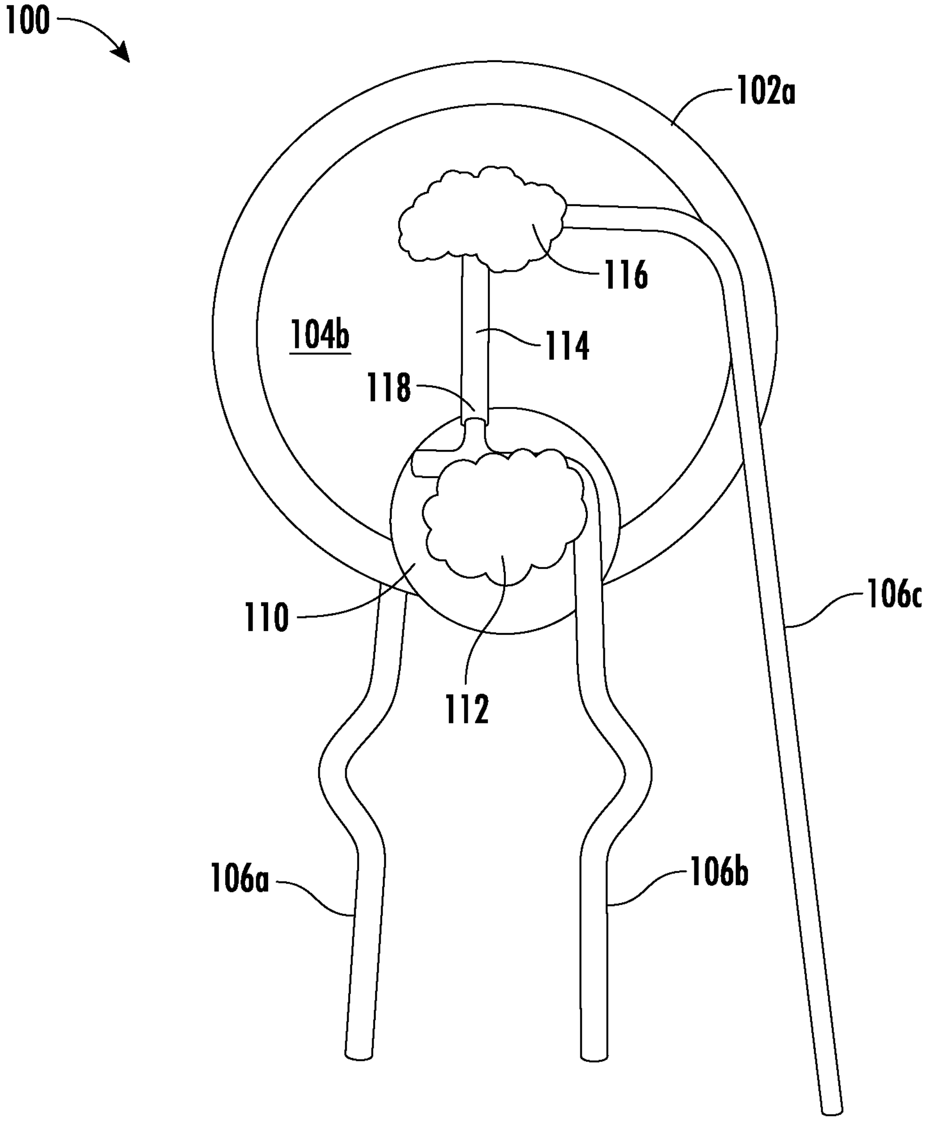
FIG. 1A (PRIOR ART)
FIGS. 1A-1D are diagrams illustrating a thermal metal oxide varistor (TMOV), in accordance with the prior art.
Figure 1B:
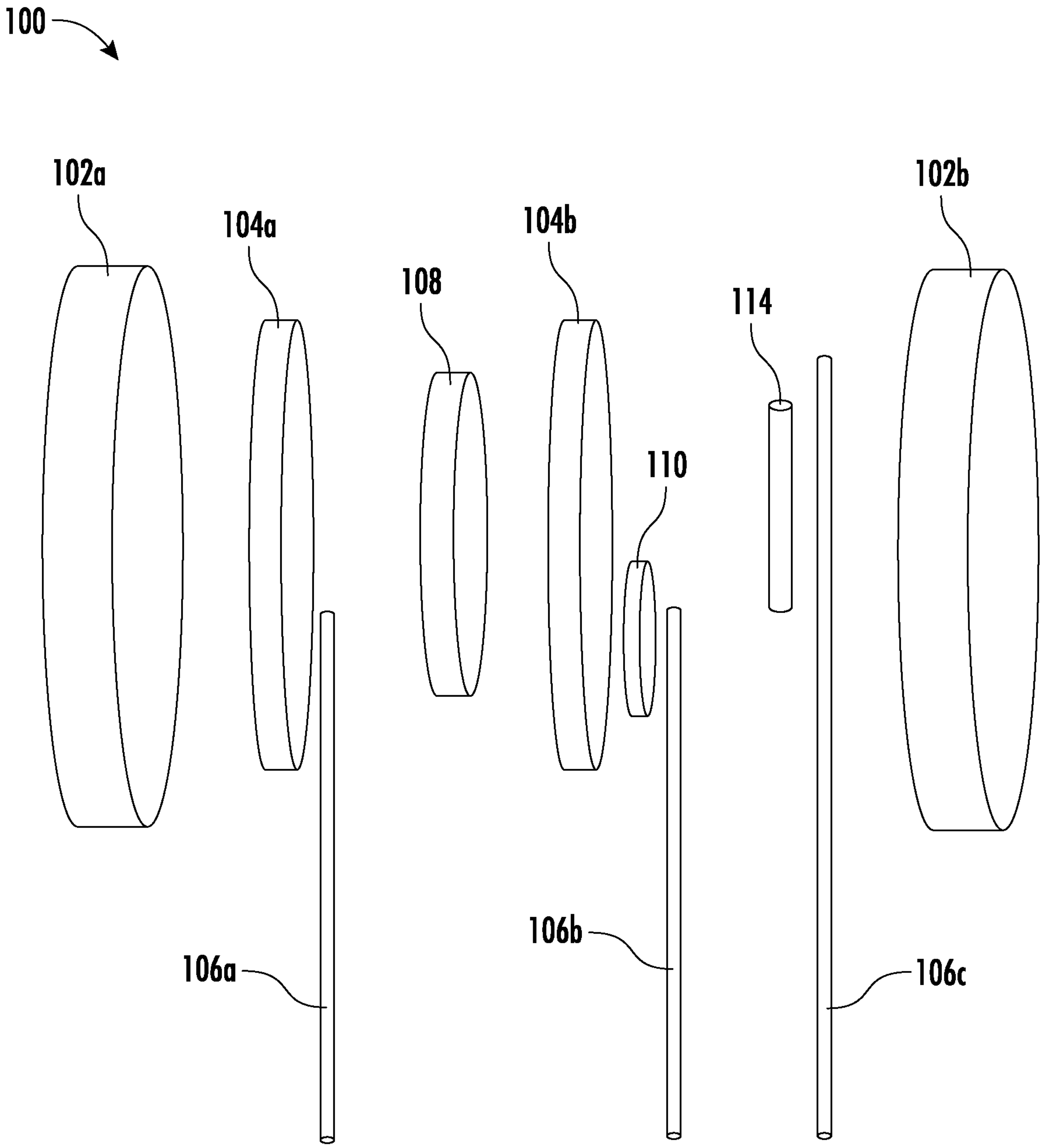
FIG. 1B (PRIOR ART)
Figure 1C:
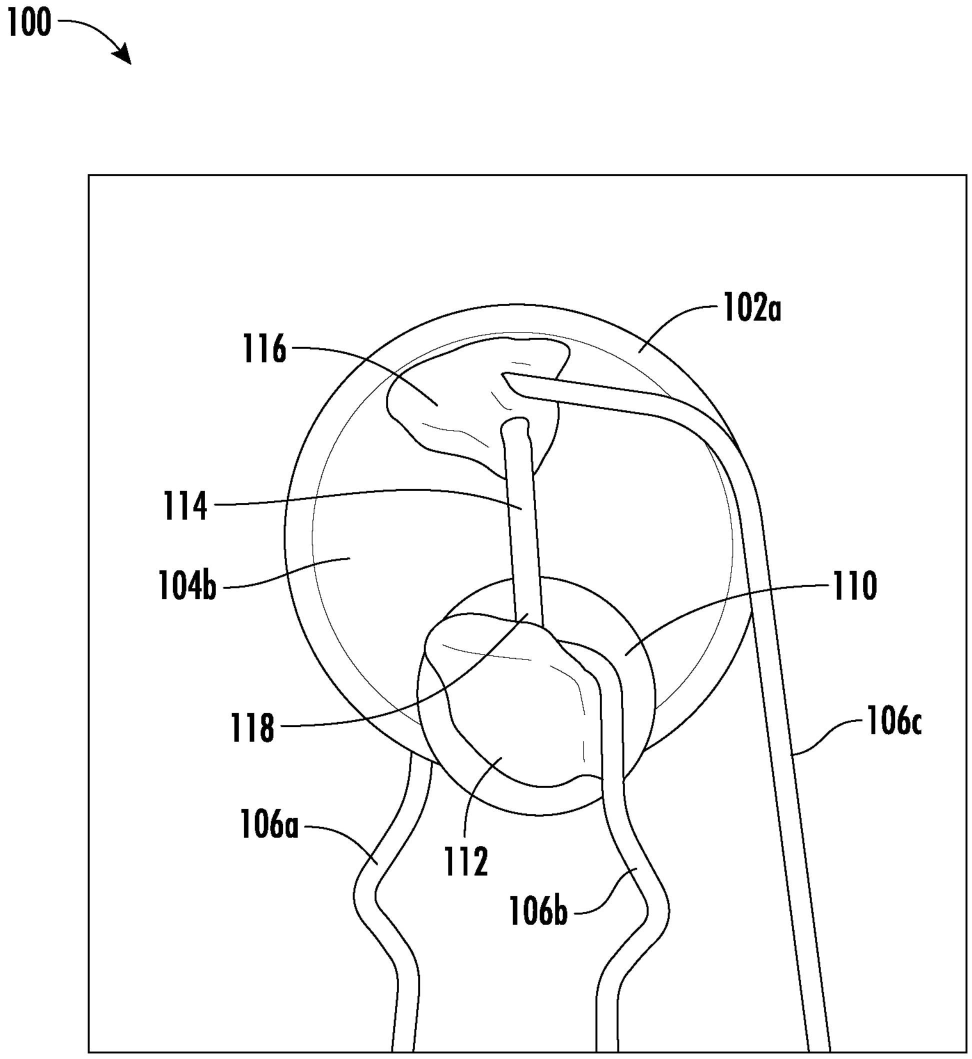
Figure 1D:
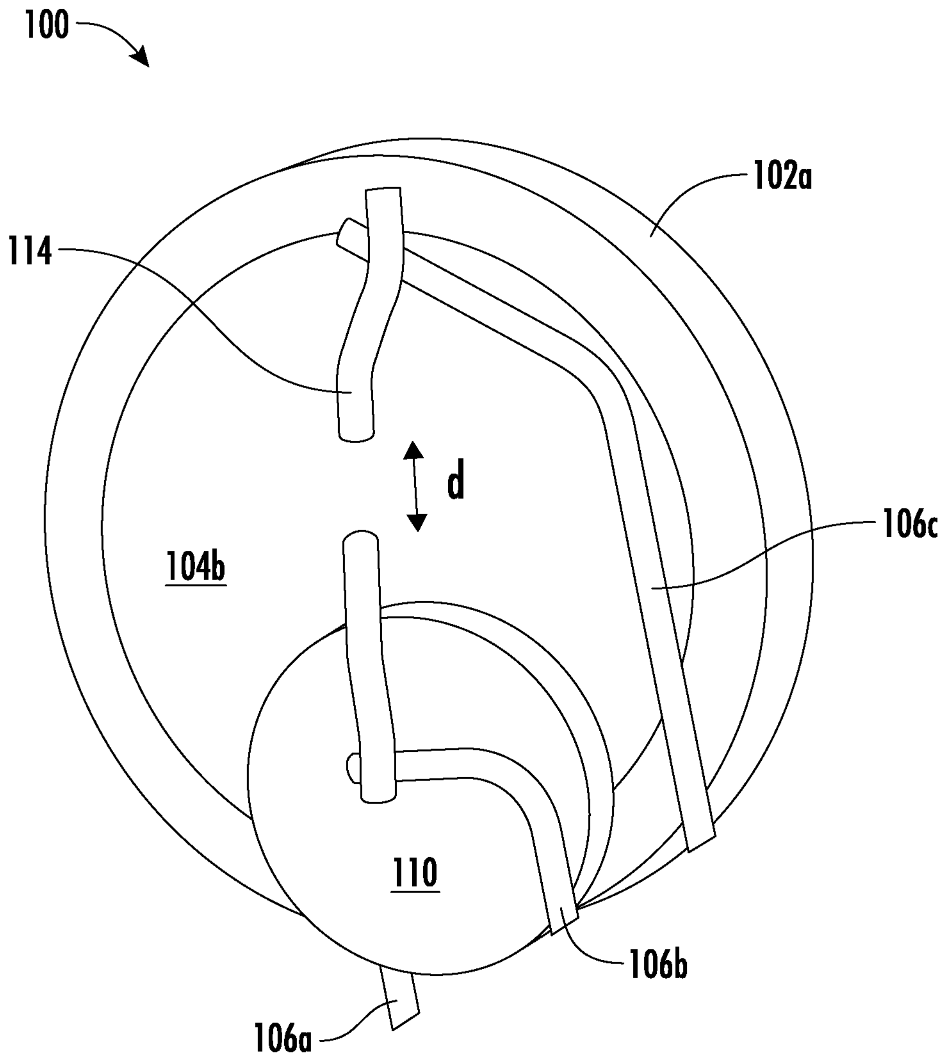

FIGS. 1A-1D are representative drawings of a thermally protected metal oxide varistor (TMOV) 100 for providing overvoltage protection, according to the prior art. FIG. 1A is a plan view, FIG. 1B is an exploded perspective view, FIG. 1C is a second plan view, and FIG. 1D is a perspective view of the TMOV 100. The TMOV 100 is an example of a radial leaded disc type of MOV. The TMOV 100 includes a first ceramic resistor 102*a* and a second ceramic resistor 102*b* (FIG. 1B) (collectively, “ceramic resistor(s) 102”). The two ceramic resistors 102 surround and contain the other components of the TMOV 100. Looking particularly at FIG. 1B, the ceramic resistors 102 house two electrodes 104*a* and 104*b* (collectively, “electrode(s) 104”) with a MOV body 108 sandwiched between the two electrodes. The MOV body 108 is a crystalline microstructure featuring zinc oxide mixed with one or more other metal oxides that allows the TMOV 100 to dissipate high levels of transient energy across the bulk of the device. Put another way, the MOV body 108 has a matrix of conductive zinc oxide grains separated by grain boundaries, providing P-N junction semiconductor characteristics, with the boundaries blocking conduction at low voltages and being the source of nonlinear electrical conduction at higher voltages. Both sides of the ceramic resistor 102 are to be covered in an encapsulant, such as epoxy (not shown). The epoxy may be a liquid crystal polymer (LCP) or polyphenylene sulfide (PPS), as two examples.

An electrode 104*b* is visible in FIGS. 1A and 1C while electrode 104*a* is shown in FIG. 1B. The ceramic resistor 102*b* and MOV body 108 are visible in the exploded view of FIG. 1B. The electrode 104*a* is affixed to ceramic resistor 102*a* while electrode 104*b* is affixed to ceramic resistor 102*b*, with the MOV body 108 being disposed the two electrodes. The ceramic resistors 102, the electrodes 104, and the MOV body 108 are each substantially circular disc-shaped, with the ceramic resistors having a slightly larger radius than the electrodes, though each of these components may alternatively assume non-circular shapes. The radial edge of ceramic resistor 102*a* is visible “behind” the electrode 104*b* in FIG. 1A.

The TMOV 100 features lead wires 106*a-c* extending radially outward from the ceramic resistor 102 (collectively, “lead wires 106”). A first lead wire 106*a* extends downward on one side (left side in FIG. 1A) of the ceramic resistor 102, a second lead wire 106*b* extends downward in the center of the ceramic resistor, and a third lead wire 106*c* extends downward on the other side (right side in FIG. 1A) of the ceramic resistor, with the second lead wire being disposed between the first and third lead wires. The lead wire 106*a* connects to electrode 104*a*, (FIG. 1B) which is “behind” the electrode 104*b* in FIG. 1A, while the lead wires 106*b* and 106*c* connect to the electrode 104*b*. The lead wire 106*c* may be connected to monitoring circuitry (not shown), thus providing an indication when the TMOV 100 is disconnected from a circuit. The lead wires 106 are made from an electrically conductive material, such as copper, and may be tin plated.

The lead wire 106*b* connects to a thermal cut-off (TCO) 114 wire at a thermal link 118, while the other side of the TCO is connected to the electrode 104*b* at a soldering joint 116. The TCO 114 is electrically connected in series to the MOV body 108. While the MOV body 108 enables the TMOV 100 to operate as a surge suppressor, the TCO 114 provides integrated thermal protection which breaks, thus creating an open circuit within the TMOV in the event of overheating due to sustained overvoltages. During normal operation, a current flowing through the TMOV 100 travels from the lead wire 106*b*, through the TCO 114, through the electrode 104*b*, through the MOV body 108, to the other electrode 104*a*, and finally to the lead wire 106*a*, and vice-versa.

An alumina oxide sheet 110 made up of alumina flakes is disposed beneath the lead wire 106*b* and adjacent the electrode 104*b*. A hot melt glue 112 is deposited over the alumina oxide sheet 110 to fix the alumina oxide sheet in place. The TCO 114 is connected to the electrode 104*b* by a soldering joint 116. During sustained over-voltage conditions, the soldering joint 116, the TCO 114, and the hot melt glue 112 becoming molten and break connection to the lead wire 106*b*, resulting in an open circuit within the TMOV 100.

The exploded view in FIG. 1B is somewhat exaggerated, as the electrodes 104 and alumina oxide sheet 110 of the TMOV 100 are usually quite thin sheets of electrically conductive material. The alumina oxide sheet 110 is also quite thin. Different materials can be used to make the electrodes 104, such as silver, copper, aluminum, nickel, or combinations of these materials. However, these electrically conductive materials have different properties, such as their melting points. Silver, for example, has a lower melting point than copper.

FIG. 1D shows the TMOV 100 in which a breakage of the TCO 114 has occurred. Once broken, there is a gap having dimension, d, between two portions of the TCO 114. Because the TMOV 100 is quite small, the gap is also quite small. Thus, despite the TCO 114 breaking, as designed, some of the melted wire may be deposited in the gap, allowing current to travel across the broken portions of the TCO 114. When this occurs, the TCO 114 has not served its intended function and the TMOV 100 may catch fire. Further, the epoxy coating of the TMOV 100 may burn due to overheating of the MOV body 108.

Figure 2A:
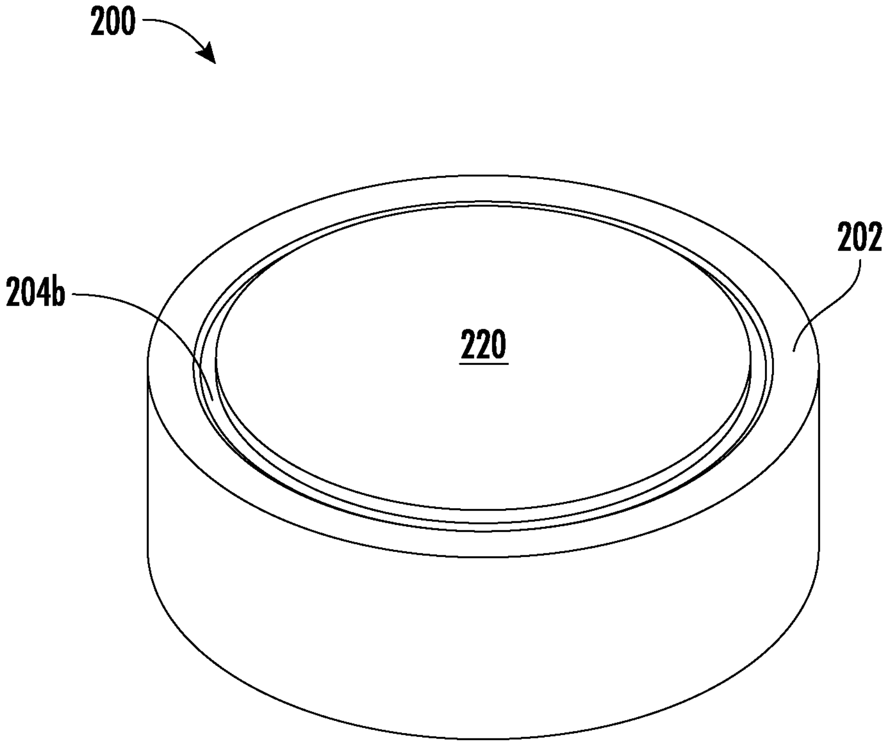
FIGS. 2A-2C are diagrams illustrating an enhanced TMOV, in accordance with exemplary embodiments.
Figure 2B:
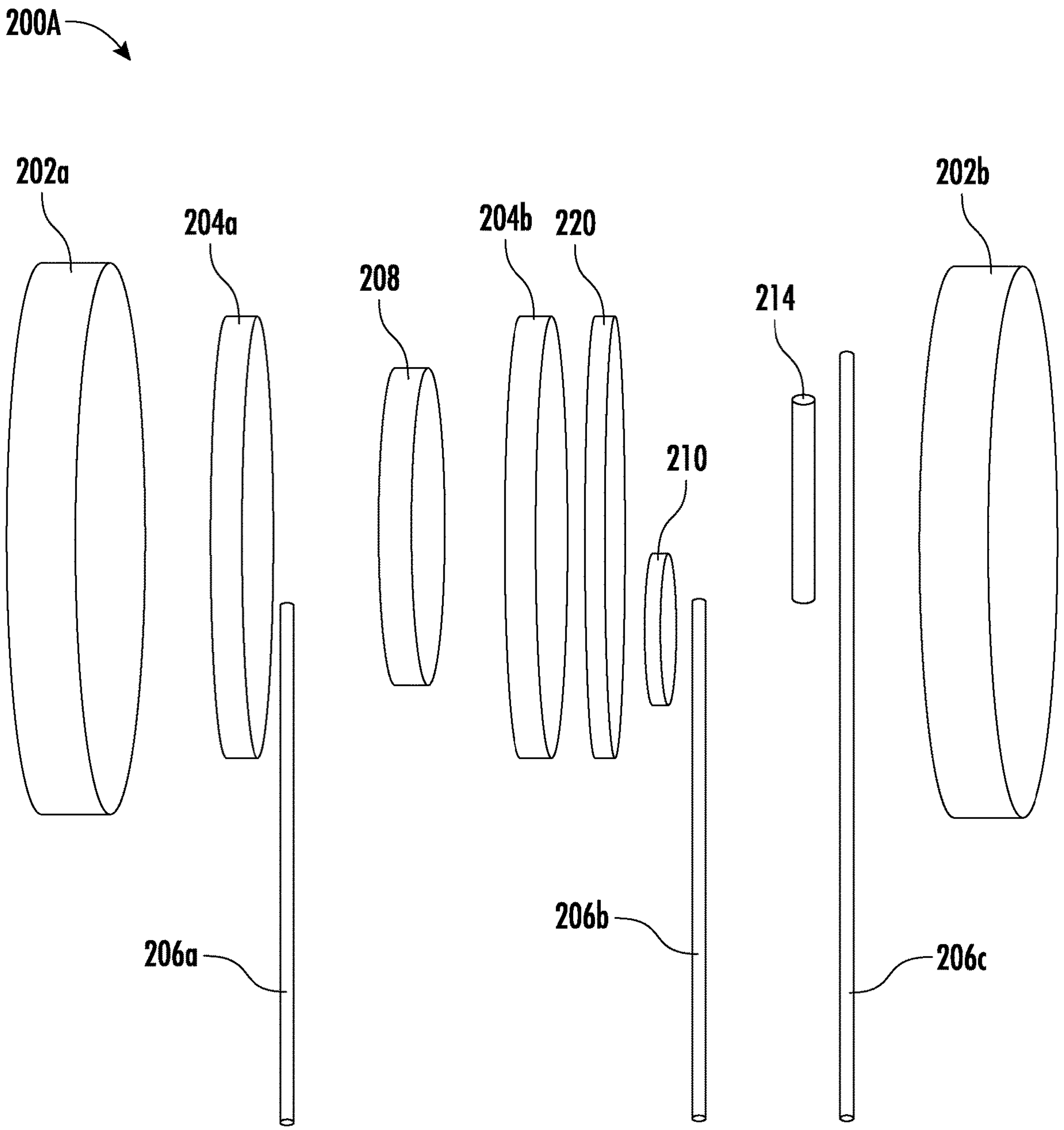
Figure 2C:
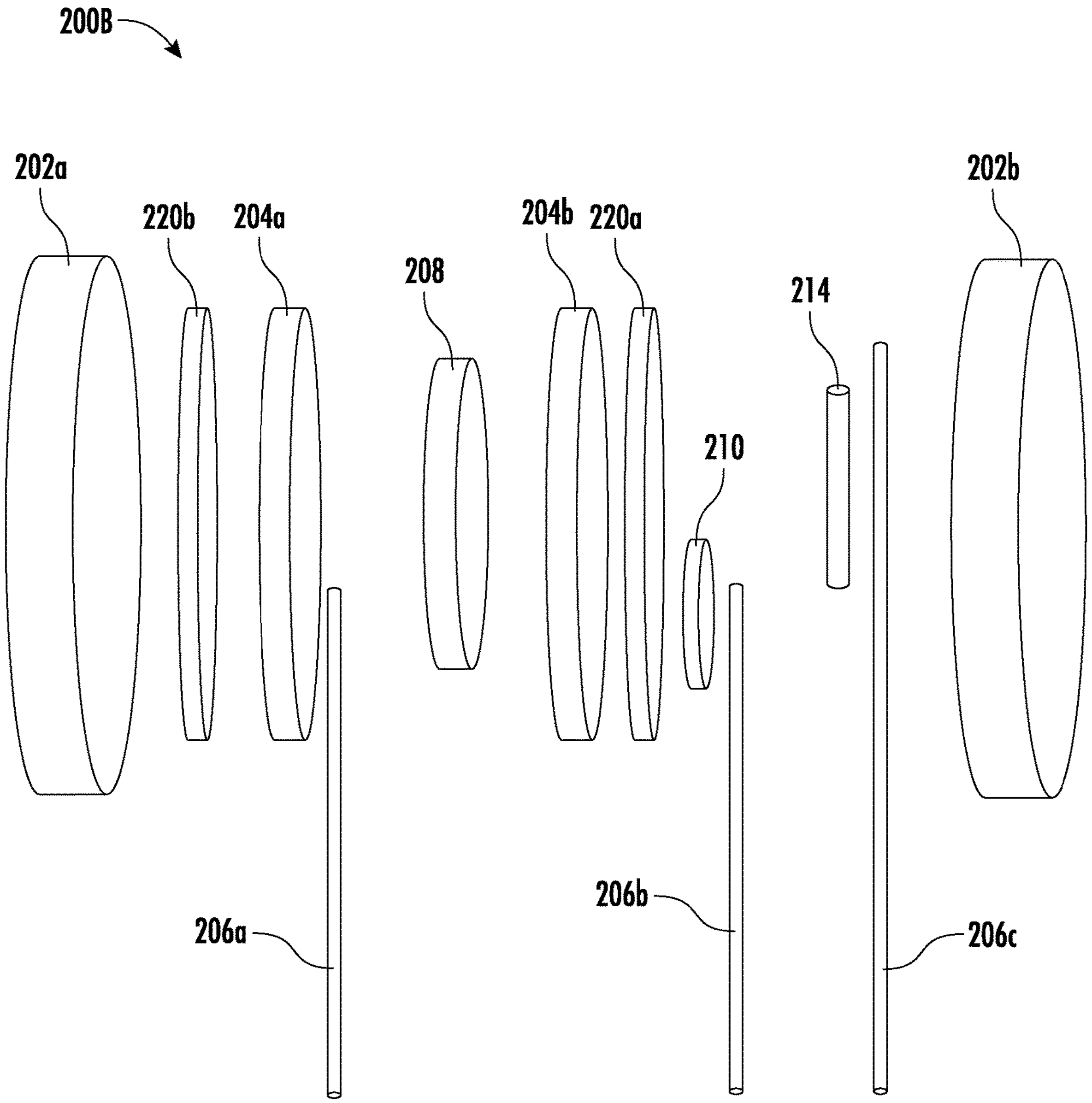

FIGS. 2A-2C are representative drawings of an enhanced TMOV 200, according to exemplary embodiments. FIG. 2A is a perspective view, FIG. 2B is an exploded perspective view of the TMOV 200A, and FIG. 2C is an exploded perspective view of TMOV 200B (collectively, “TMOV(s) 200”). The TMOVs 200 have features that mitigate the fire hazards caused by the prior art TMOV 100. Like the prior art TMOV 100, the TMOVs 200 are radial leaded disc types. The TMOVs have isolation enhancement features designed to cut the circuit with high reliability under abnormal overvoltage conditions.

The TMOVs 200 each include a first ceramic resistor 202*a* and a second ceramic resistor 202*b* (collectively, “ceramic resistor(s) 202”). The two ceramic resistors 202 surround and contain the other components of the TMOV 200. The ceramic resistors 202 house two electrodes 204*a* and 204*b* (collectively, “electrode(s) 204”) with a MOV body 208 sandwiched between the two electrodes. Both sides of the ceramic resistor 202 are to be covered in an encapsulant, such as epoxy (not shown). The epoxy may be a liquid crystal polymer (LCP) or polyphenylene sulfide (PPS), as two examples.

The electrode 204*a* is affixed to ceramic resistor 202*a* while electrode 204*b* is affixed to ceramic resistor 202*b*, with the MOV body 208 being disposed the two electrodes. In exemplary embodiments, TMOV 200A features a barrier layer 220 disposed between electrode 204*b* and ceramic resistor 202*b* (FIG. 2B). Alternatively, TMOV 200B features two barrier layers 220*a* and 220*b*, with barrier layer 220*a* being disposed between electrode 204*b* and ceramic resistor 202*b* and barrier 220*b* being disposed between electrode 204*a* and ceramic resistor 202*a* (collectively, “barrier layer(s) 220”). When the MOV body 208 becomes overheated, the barrier layer 220 is designed to keep the encapsulant surrounding the ceramic resistors 202 from overheating, burning, or catching fire. The barrier layer 220 is thus a type of isolator disk.

In exemplary embodiments, the barrier layer 220 is composed of two metal foils and is tin plated on both sides. In some embodiments, the barrier layer 220 is made from $Al_2O_3$. The barrier layer 220 absorbs the heat from the MOV body 208 to mitigate the likelihood of encapsulant overheating. In exemplary embodiments, the barrier layer 220 has a thickness of between 0.1 mm and 0.5 mm, with a typical thickness being 0.2 mm.

The TMOV 200 features lead wires 206*a-c* extending radially outward from the ceramic resistor 202 (collectively, "lead wires 206"). A first lead wire 206*a* extends downward on one side of the ceramic resistor 202, a second lead wire 206*b* extends downward in the center of the ceramic resistor, and a third lead wire 206*c* extends downward on the other side of the ceramic resistor, with the second lead wire being disposed between the first and third lead wires. The lead wire 206*a* connects to electrode 204*a*, while the lead wires 206*b* and 206*c* connect to the electrode 204*b*. The lead wire 206*c* may be connected to monitoring circuitry (not shown), thus providing an indication when the TMOV 200 is disconnected from a circuit. The lead wires 206 are made from an electrically conductive material, such as copper, and may be tin plated.

The lead wire 206*b* connects to a thermal cut-off (TCO) 214 wire while the other side of the TCO is connected to the electrode 204*b*. The TCO 214 is electrically connected in series to the MOV body 208. During normal operation, a current flowing through the TMOV 200 travels from the lead wire 206*b*, through the TCO 214, through the electrode 204*b*, through the MOV body 208, to the other electrode 204*a*, and finally to the lead wire 206*a*, and vice-versa. An alumina oxide sheet 210 made up of alumina flakes is disposed beneath the lead wire 206*b* and adjacent the electrode 204*b*.

Figure 3A:
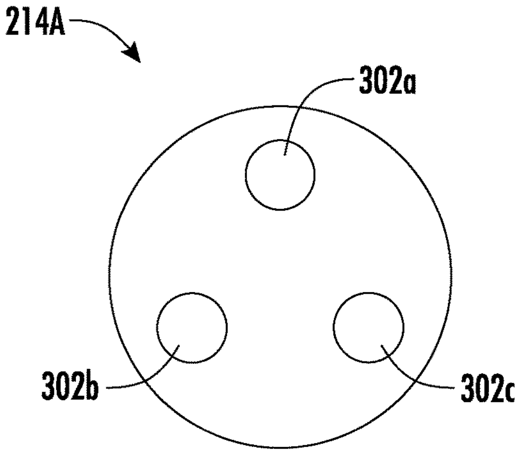
FIGS. 3A-3F are diagrams illustrating the thermal cut-offs (TCO) used in the TMOV of FIGS. 2A-2C, in accordance with exemplary embodiments.
Figure 3B:
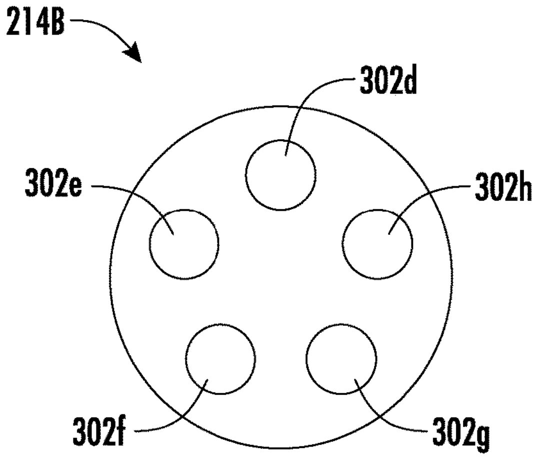
Figure 3C:
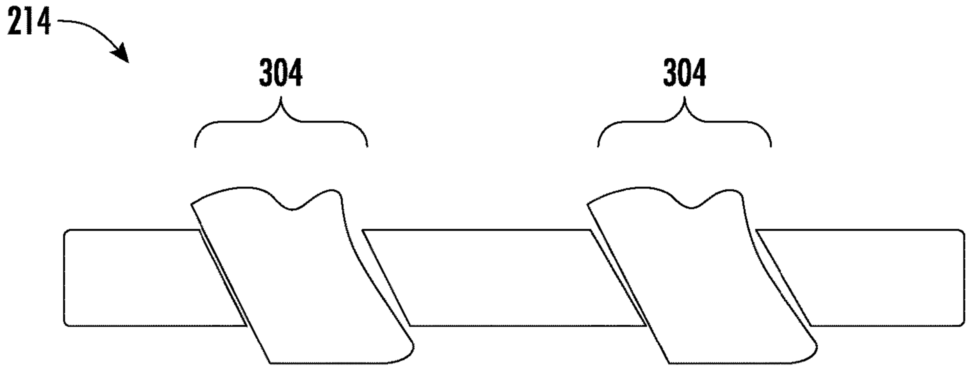
Figure 3D:
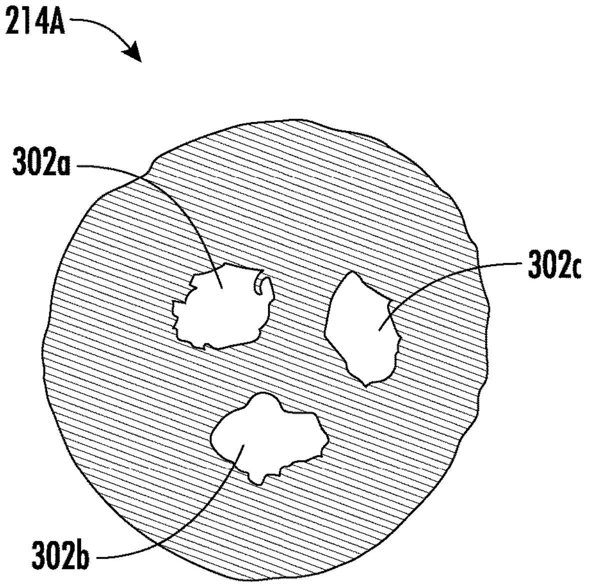
Figure 3E:
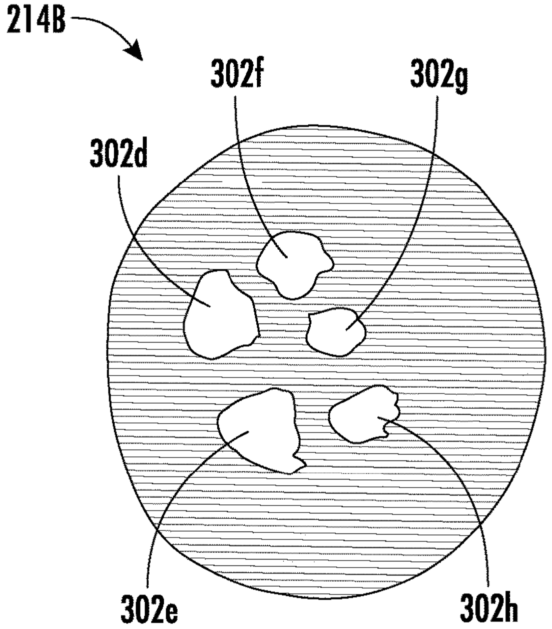
Figure 3F:
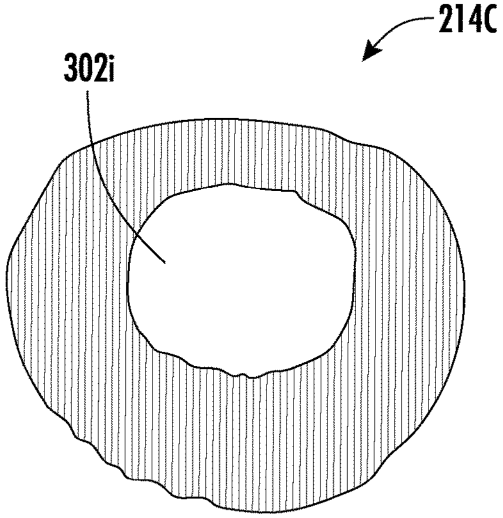

FIGS. 3A-3F are representative drawings of the TCO 214 of the TMOV 200, according to exemplary embodiments. FIGS. 3A and 3D are cross-sections of TCO 214*a*, FIGS. 3B and 3E are cross-sections of TCO 214*b*, FIG. 3F is a cross-section of TCO 214*c*, and FIG. 3C is a plan view of TCO 214. In exemplary embodiments, the TCO 214 of the TMOV 200 is made of a solder paste having one or more cores. TCO 214*a* has three cores 302*a-c*, TCO 214*b* has five cores 302*d-h*, and TCO 214*c* has one core 312*i* (collectively, "core(s) 302"). Although one-, three-, and five-core embodiments are shown, the number of cores may vary. In exemplary embodiments, the cores 302 are filled with a flux material that changes from a solid to a liquid once the TMOV 200 reaches a certain temperature. In exemplary embodiments, the flux material is a rosin.

In exemplary embodiments, the solder paste of the TCO 214 is a solder wire that is between 0.8 mm and 2 mm thick. In some embodiments, a SAC 305 solder paste consisting of 96.5% Sn, 3.0% Ag, and 0.5% Cu is used for the TCO 214. In other embodiments, a SN100C solder paste consisting of 99.3% Sn and 0.7% Cu is used for the TCO 214. In exemplary embodiments, the flux material of the core 302 is a solid between temperatures of 80° C. and 120° C. Above 120° C., the flux material becomes a liquid. The flux material inside the TCO 214 thus acts as an isolation material during the abnormal overvoltage condition, ensuring that the circuit inside the TMOV 200 remains opened.

The selection of how many cores to use in the TCO 214 depends on how much short-circuit current is flowing through the TCO 214. Thus, the TCO 214 may be selected based on the voltage rating of the TMOV 200. FIG. 3C shows isolation regions 304 of the broken TCO 214. Once the flux material changes from a solid to a liquid, this facilitates very high resistance between the separate segments of the molten TCO 214, which, in exemplary embodiments, significantly enhances the creepage distance therefore achieving very high isolation strength.

After the TCO 214 opens under the overvoltage condition, the isolation (flux) material will flow into the isolation regions 304 (melting area). By keeping the portions of the TCO 214 separated, this facilitates isolation strength between line and neutral, which will be much safer for overvoltage protection reliability of the TMOV 200. Further, the barrier layer 220 will prevent molten solder from touching MOV electrode to avoid reconnecting the open circuit.

Thus, with both the modified TCO 214 and the barrier layer 220, the TMOV 200 overvoltage and thermal protect performance is highly enhanced over the prior art TMOV 100. These features are inexpensive and easy to add to the manufacturing assembly of the TMOV. Although the enhanced TCO 214 and barrier layer 220 are described with respect to a TMOV, these features may also be implemented in an MOV that is not thermally protected.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof

What is claimed is:

1. A metal oxide varistor (MOV) comprising:

an MOV body comprising a crystalline microstructure featuring zinc oxide mixed with one or more other metal oxides;

a first electrode disposed adjacent a first side of the MOV body, wherein the first electrode is coupled to a first radial lead;

a second electrode disposed adjacent a second side of the MOV body, wherein the second electrode is coupled to a second radial lead;

a thermal cut-off disposed adjacent the second electrode, the thermal cut-off comprising solder paste having at least one core, the at least one core comprising a solid at a first temperature and a liquid at a second temperature;

a first ceramic resistor adjacent the first electrode;

a second ceramic resistor adjacent the second electrode; and a barrier layer disposed between the second electrode and the second ceramic resistor, wherein the barrier layer keeps the encapsulant from overheating.

2. The MOV of claim 1, wherein the first ceramic resistor and the second ceramic resistor are coated with an encapsulant.

3. The MOV of claim 2, wherein the encapsulant is an epoxy.

4. The MOV of claim 1, further comprising a second barrier layer disposed between the first electrode and the first ceramic resistor.

5. The MOV of claim 1, wherein the solder paste comprises 96.5% Sn, 3.0% Ag, and 0.5% Cu.

6. The MOV of claim 1, wherein the solder paste comprises 99.3% Sn and 0.7% Cu.

7. The MOV of claim 1, wherein the at least one core is rosin.

8. The MOV of claim 1, wherein the at least one core is a solid between temperatures of 80° C. and 120° C.

9. The MOV of claim 1, wherein the at least one core is a liquid above 120° C.

10. A metal oxide varistor (MOV) comprising:

an MOV body comprising a crystalline microstructure that blocks conduction at low voltages;

a first ceramic resistor coated with an encapsulant;

a second ceramic resistor coated with the encapsulant, wherein the MOV body is disposed between the first ceramic resistor and the second ceramic resistor;

a first electrode disposed between the MOV body and the first ceramic resistor, wherein the first electrode is coupled to a first radial lead; and a barrier layer disposed between the first electrode and the first ceramic resistor, wherein the barrier layer keeps the encapsulant from catching fire in response to overheating of the MOV body, wherein the barrier layer comprises a foil layer with tin plating on each side.

11. The MOV of claim 10, further comprising:

a second electrode disposed between the MOV body and the second ceramic resistor, wherein the second electrode is coupled to a second radial lead.

12. The MOV of claim 10, wherein the encapsulant is an epoxy.

13. The MOV of claim 10, further comprising a thermal cut-off disposed adjacent the barrier layer, the thermal cut-off comprising solder paste having at least one core.

14. The MOV of claim 13, wherein the at least one core comprises a solid at a first temperature and a liquid at a second temperature.

15. The MOV of claim 14, wherein the at least one core is a solid between temperatures of 80° C. and 120° C.

16. The MOV of claim 15, wherein the at least one core is a liquid above 120° C.

17. The MOV of claim 13, wherein the at least one core is rosin.

* * * * *